United States Patent [19]

Musselwhite

[11] Patent Number: 4,768,830
[45] Date of Patent: Sep. 6, 1988

[54] INFLATABLE SEAT
[75] Inventor: James Musselwhite, Portsmouth, England
[73] Assignee: FPT Industries Limited, Portsmouth, England
[21] Appl. No.: 57,103
[22] Filed: Jun. 3, 1987
[30] Foreign Application Priority Data
   Jun. 18, 1986 [GB] United Kingdom ................. 8614813
[51] Int. Cl.[4] ............................................... A47C 4/00
[52] U.S. Cl. ..................................... 297/331; 297/14; 297/380; 297/DIG. 3
[58] Field of Search .................. 297/14, 331, 380, 381, 297/DIG. 3, 464, 465

[56] References Cited
U.S. PATENT DOCUMENTS
3,419,309 12/1968 Smith ............................... 297/380 X
4,040,655 8/1977 Garrick et al. ............... 297/DIG. 3
4,145,083 3/1979 Urban ................................. 297/464
4,555,140 11/1985 Nemoto ......................... 297/284 X
4,673,213 1/1987 Bushey ................................. 297/380

FOREIGN PATENT DOCUMENTS
1078724 1/1980 Canada ......................... 297/DIG. 3
0170116 2/1986 European Pat. Off. .............. 297/14

Primary Examiner—James T. McCall
Attorney, Agent, or Firm—Larson and Taylor

[57] ABSTRACT

A seat has an inflatable seat base member, a back rest member and attachments for securing the seat to rigid structure of a vehicle in which it is installed. A top seating surface of the seat base member is further supported by support panel members attached one to each side end wall of the seat base member and extending upwardly to connect with vehicle rigid structure so that a supported seating surface is available for use when the seat base member is deflated.

7 Claims, 3 Drawing Sheets

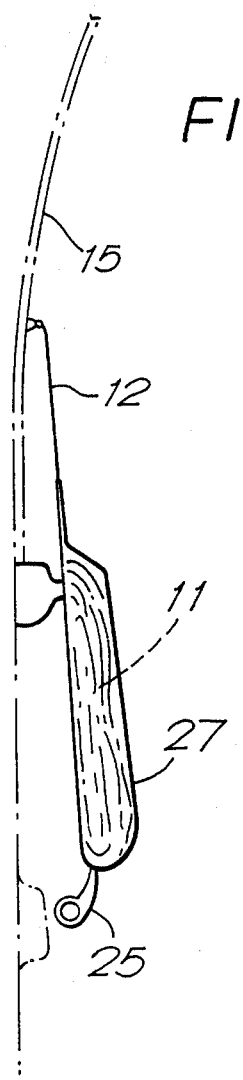
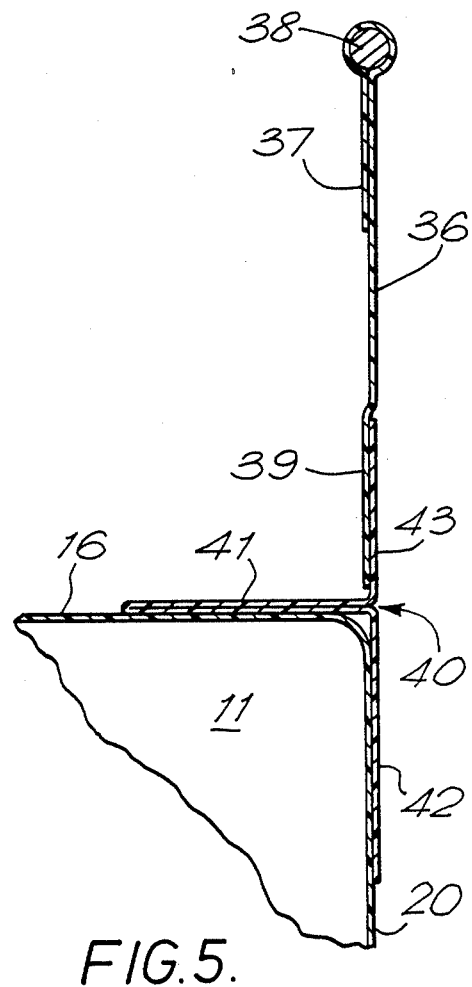
FIG.4.
FIG.5.

INFLATABLE SEAT

BACKGROUND OF THE INVENTION

1. Field of the Invention

This invention relates to seats and is more particularly concerned with a seat having an inflatable seat base member.

2. Description of the Prior Art

Seats having inflatable base members are known, see for example UK-A-No. 862,346; UK-A-No. 993,430; UK-A-No. 1,343,281; UK-A-No. 1,338,624 and UK-A-No. 1,465,698.

Such seats find particular use in vehicles such as helicopters where there is a requirement to convert from a passenger carrying role to a freight carrying role. Inflatable seats are readily deflated and stowed or removed; furthermore, they are light in weight compared to conventional seats and they provide a cushioning effect in a crash situation.

A disadvantage of known seats having inflatable base members is that should the base member be punctured so that it cannot be inflated, or if inflated becomes deflated, then the seat is lost.

UK-A-No. 1,465,698 discloses a seat having an inflatable base member and an inflatable back rest member. Straps are secured to the upper surface of the back rest member and are adapted for suspension from rigid structure of a vehicle in which the seat is installed by snap hooks to provide support for the back rest member. Also, triangular-shaped nets are secured at each end of the seat between floor structure and overhead structure of the vehicle so as to restrain a seat occupant, particularly in a crash situation. However, neither the straps or the nets provide direct support for the seat base member. As a term of art these triangular-shaped nets are frequently referred to by use as "end sails".

SUMMARY OF THE INVENTION

It is an object of the present invention to provide a seat having an inflatable seat base member which overcomes the aforementioned problem.

In meeting this object, the present invention provides a seat adapted for installation in a vehicle comprising an inflatable seat base member having a top wall providing a seating surface, a bottom wall, side end walls and front and back walls, a back rest member attached at one end to the seat base member and extending therefrom to an opposite end having means for attachment to rigid structure of a vehicle in which the seat is installed, and support means attached to the seat base member at each side end thereof and adapted for attachment back to rigid structure of the vehicle so as to support the top seating surface wall whereby a supported seating surface is provided when the seat base member is deflated.

The support means preferably comprise support panel members manufactured from flexible material.

Each support panel member may comprise a substantially triangular panel having a base edge portion attached along an upper portion of a side end wall of the seat base member and means for connecting an opposite apex portion of the triangular panel to rigid structure of the vehicle.

In a preferred embodiment of the invention each substantially triangular panel is attached along a base edge portion to the seat base member at the juncture of the side end wall and top seating surface wall, and further includes reinforcing means extending along another edge portion of the triangular panel, the reinforcing means comprising a flexible tie member secured at one end by stitching and/or bonding to the upper portion of the seat base member side end wall at a position towards the front of the seat base member and having the connecting means provided at its opposite end.

The flexible tie member may comprise a rope or a tape which may be manufactured from high strength nylon.

The connecting means may comprise a hook adapted for engagement with a ring, eye or rail mounted on a strong point on the vehicle rigid structure.

The back rest member may be inflatable or it may comprise a sheet of reinforced elastomeric material extending from attachment at one edge portion along a rear portion of the top seat wall of the seat base member to an opposite edge portion adapted for attachment to the vehicle rigid structure.

Releasable fastening means may be provided on the back rest member intermediate its upper and lower edge portions for securing the seat base member when it is deflated in a folded stowed condition against the back rest member.

The seat base member may be compartmented by one or more diaphragms to assist in retaining a desired shape when inflated.

BRIEF DESCRIPTION OF THE DRAWINGS

The invention will now be further described by way of example only and with reference to the accompanying drawings, in which:

FIG. 4 shows the seat in a stowed condition; and

FIG. 5 is a section on line V—V in FIG. 1.

DETAILED DESCRIPTION OF THE INVENTION

Figure 3:
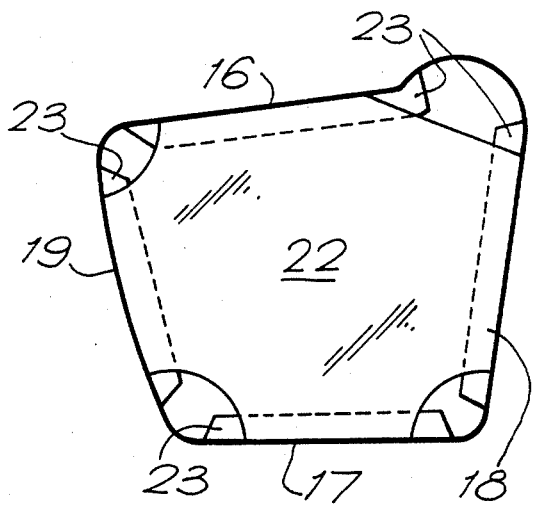
FIG. 3 is a cross-sectional view through a seat base member on line III—III of FIG. 2.
Figure 1:
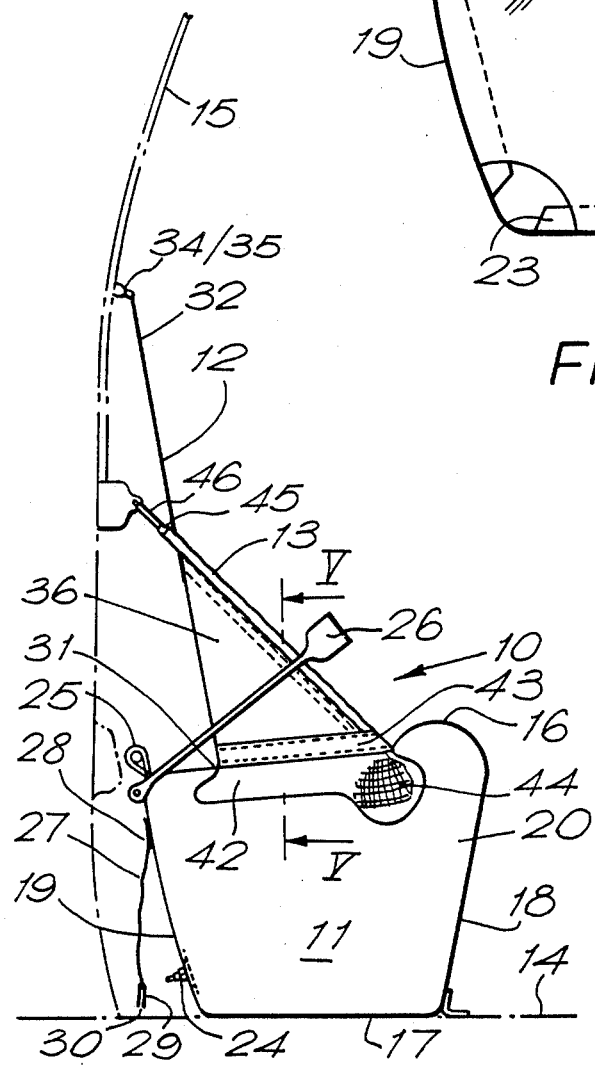
FIG. 1 is a side elevation of a seat in accordance with one embodiment of the present invention.
Figure 2:
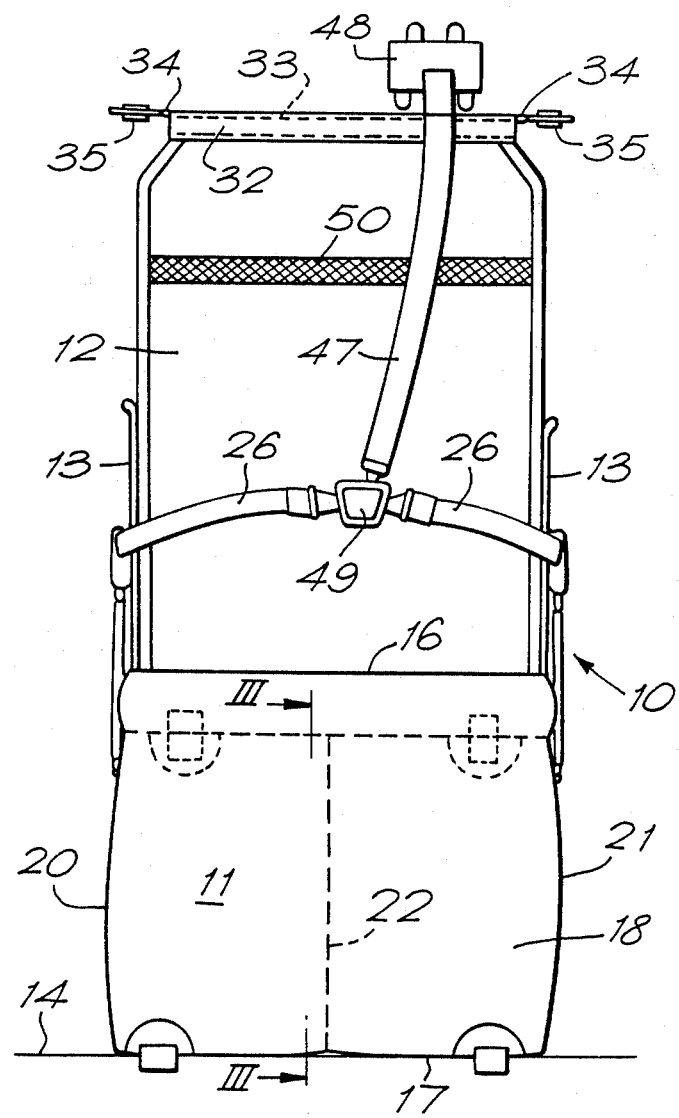
FIG. 2 is a front elevation of the seat shown in FIG. 1.

Referring first to FIGS. 1, 2 and 3 of the drawings, a seat 10 in accordance with one embodiment of the invention, comprises three major components, are inflatable seat base member 11 shown inflated in FIGS. 1, 2 and 3, a back rest member 12, and support means provided by support panel members 13 secured one at each side end of the seat base member 11. Each of these components is manufactured at least in part from reinforced elastomeric sheet material such as, for example, synthetic rubber sheet reinforced with woven nylon fabric and sold by FPT Industries Limited under their Registered Trade Mark 'HYCAFLEX'. This material is hereinafter referred to as sheet material. In FIGS. 1 and 2 the seat 10 is shown installed with rigid floor structure 14 and rigid side body structure 15 of a vehicle such as a helicopter (not shown).

The inflatable seat base member 11 has a top seating surface wall 16, a bottom wall 17, front and back walls 18 and 19, respectively, and side end walls 20 and 21. As seen in FIG. 3, the seat base member 11 is provided with an internal diaphragm 22 extending transversely of the base member between the front wall 18 and rear wall 19 and being attached thereto and to the top and bottom walls 16 and 17, respectively, by flanged members 23. The diaphragm 22 assists in retaining the required shape for the seat base member 11 against inflation pressure so that it may be manufactured from unsealed woven nylon fabric and cut away at its corners, as shown in FIG. 3, to permit pressurised air inflating the seat base member to pass from one side to the other. An inflation/deflation valve 24 is provided in the back wall 19 of the seat base member 11.

The seat base member may also be provided with pressure relief means (not shown), such as a pressure release valve or burstable disc, for relieving pressure in the seat base member in a crash case.

Near to each side end wall 20, at the juncture of the top seating surface wall 16 and the back wall 19, a length of high strength webbing material is stitched and bonded to the walls 16 and 19 to form a loop 25 by which the seat base member 11 is connected by suitable means such as a hook or shackle (not shown) to the rigid side body structure 15.

Just below the loops 25 provision may be made on the back wall 19, such as by similar loops (not shown), for the attachment of lap seat harnesses 26.

A seat stowage cover 27 is attached by stitching and bonding along one edge portion 28 across the back wall 19 at a position below the loops 25 and a strip of touch and close releasable fastening material 29, such as that sold under the Registered Trade Mark 'VELCRO', is attached along the opposite edge portion 30 of the cover 27. When the seat base member 11 is inflated, as shown in FIG. 1, the cover 27 hangs downwardly from its attachment to the back wall 19. The cover 27 is used to enclose the seat base member 11 when it is deflated and folded and stowed against the back rest member 12 as shown in FIG. 4.

The back rest member 12 in this embodiment of the invention is provided by a length of sheet material stitched and bonded along a lower edge portion 31 to the top seating surface wall 16 of the seat base member 11 near to the juncture of the wall 16 with the back wall 19. The opposite edge portion 32 of the back rest member 12 is folded back on itself around a high strength rope 33 and stitched and bonded to itself. The rope 33 is provided with looped ends 34 to which are attached links or hooks 35 by which the back rest member 12 is connected to suitable strong points on the rigid side body structure 15.

A seat 10 in accordance with the present invention has support panel members 13 at each side end of the seat. The construction and function of one of these support panel members 13 will now be described with particular reference to FIGS. 1 and 5 of the accompanying drawings.

The support panel member 13 comprises a substantially triangular panel 36 which is folded back on itself along one edge portion 37 around a high strength nylon rope 38 and stitched and bonded to itself as is best seen in FIG. 5. A base edge portion 39 of the panel 36 is attached to the top seating surface wall 16 and side end wall 20 of the seat base member 11 by a T-shaped attachment member 40. The T-shaped attachment member 40 is formed by folding a strip of sheet material back on itself to provide a centre leg 41 which is bonded to the top seating surface wall 16 of the seat base member 11 along its juncture with the side end wall 20. The edge portions of the attachment member 40 are folded outwardly away from each other to form arms 42 and 43, the arm 42 being bonded to the side end wall 20 along its juncture with the top seat surface wall 16, and the arm 43 being bonded to the base edge portion 39 of the triangular panel 36.

One end 44 of the high strength nylon rope 38 is splayed and is stitched and bonded to an enlarged portion of the arm 42 of the T-shaped attachment member 40 so as to be positioned between the arm 42 and the side end wall 20 of the seat base member 11. The opposite end 45 of the rope 38 is turned back on itself and spliced to provide a loop for attachment of a hook 46 by which the rope end 45 is connected to a suitable strong point provided on the rigid side body structure 15.

The support panel members 13 and, more particularly the ropes 38, in extending from their attachments at the upper regions of the side end wall 20 and 21 of the seat base member 11 to connection of the ropes by the hooks 46 on the rigid side body structure of the vehicle, provide support for the top seating surface wall 16 when the seat base member 11 is deployed irrespective of whether or not the seat base member is inflated. Thus, should it be found not to be possible to inflate the seat base member or should it be accidentally punctured after inflation, a supported seating surface is provided by the support panel members 13 and the top seating surface wall 16.

A shoulder and chest restraint harness 47 may be provided, as is shown in FIG. 2, the harness 47 being extendable from a reel 48 mounted on the rigid side body structure 15 of the vehicle, and being connectable with the lap harnesses 26 at a control buckle 49.

As is shown in FIG. 4, when deflated, the seat base member 11 may be folded and stowed against the back rest member 12. The seat base member is held in this folded stowed condition by the seat cover 27 which is extended upwardly around the folded seat base member so that the strip of touch and close releasable fastening material 24 along its edge portion 30 is brought into contact with a similar strip 50 of touch and close releasable fastening material which is attached to and extends across the back rest member 12 at an appropriate position between its edge portions 31 and 32 (Reference FIG. 2).

It will be appreciated that whilst the seat hereinbefore described with reference to and shown in the accompanying drawings is a single person seat, the invention is equally applicable to seats providing multiple seating places. Where the inflatable seat base member provides seating places for more than two persons one or more support panel members would be provided at positions between the seat end walls, those support panel members and their splayed rope ends which are intermediate the seat end walls being attached to the top seating surface wall of the seat base member.

What is claimed is:

1. A seat adapted for installation in a vehicle having a rigid side body structure comprising an inflatable seat base member having a top wall providing a seating surface, a bottom wall, side end walls and front and back walls, a back rest member attached at one end to the seat base member and extending therefrom to an opposite end, means mounted on said opposite end of said back rest member for attachment to said rigid side body structure of the vehicle in which the seat is installed, and flexible support means attached to the seat base member at each side end thereof, said support means being attached to said rigid side body structure of the vehicle so as to support the top seating surface wall whereby a supported seating surface is provided when the seat base member is deflated, said seat being movable between a folded stowed position against said rigid side body structure and an operative position wherein said seat base member is inflated.

2. A seat as claimed in claim 1, wherein each support means comprises a substantially triangular panel having a base edge portion attached to a respective side end wall of the seat base member and means for connecting an opposite apex portion of the triangular panel to rigid structure of the vehicle.

3. A seat as claimed in claim 2, wherein the base edge portion of each said triangular panel is attached to a respective side end wall at the juncture of said side end wall and said top seating surface wall, and reinforcing means extending along another edge portion of said triangular panel, said reinforcing means comprising a flexible tie member secured at one end to said side end wall at a position towards the front of said seat base member and extending therefrom to terminate at said opposite apex portion of said triangular panel, said connecting means being provided on said opposite end of said flexible tie member.

4. A seat as claimed in claim 3, wherein said tie member comprises a rope.

5. A seat as claimed in claim 3, wherein said tie member comprises a tape.

6. A seat as claimed in claim 2, wherein said connecting means comprises a hook.

7. A seat as claimed in claim 1, wherein releasable fastening means are attached to said back rest member intermediate its end portions for securing the deflated seat base member in a folded stowed condition against the back rest member.

* * * * *